United States Patent
Chen et al.

(10) Patent No.: US 11,085,861 B1
(45) Date of Patent: Aug. 10, 2021

(54) APPARATUS FOR REAL-TIME SIZE-DISTRIBUTED MEASUREMENT OF AEROSOL MASS CONCENTRATION

(71) Applicant: MSP Corporation, Shoreview, MN (US)

(72) Inventors: Modi Chen, Lauderdale, MN (US); Lin Li, Arden Hills, MN (US); Virgil Alan Marple, Maple Plain, MN (US); Amir A. Naqwi, Eden Prairie, MN (US); Francisco J. Romay, Vadnais Heights, MN (US); Daryl L. Roberts, Blaine, MN (US); Benjamin Y. H. Liu, North Oaks, MN (US)

(73) Assignee: MSP CORPORATION, Shoreview, MN (US)

( * ) Notice: Subject to any disclaimer, the term of this patent is extended or adjusted under 35 U.S.C. 154(b) by 746 days.

(21) Appl. No.: 14/636,890

(22) Filed: Mar. 3, 2015

Related U.S. Application Data (60) Provisional application No. 61/947,134, filed on Mar. 3, 2014.

(51) Int. Cl.
| | |
|---|---|
| *G01N 5/00* | (2006.01) |
| *G01N 1/04* | (2006.01) |
| *G01N 15/02* | (2006.01) |

(52) U.S. Cl.
CPC .......... *G01N 5/00* (2013.01); *G01N 1/04* (2013.01); *G01N 15/0255* (2013.01); *G01N 2015/0261* (2013.01)

(58) Field of Classification Search
CPC ........ G01N 5/00; G01N 1/04; G01N 15/0255; G01N 2015/0261

(Continued)

(56) References Cited

U.S. PATENT DOCUMENTS

| | | | | | |
|---|---|---|---|---|---|
| 3,653,253 | A | * | 4/1972 | Olin | ............ G01N 5/00 310/328 |
| 3,715,911 | A | * | 2/1973 | Chuan | ............ G01N 5/00 324/71.4 |

(Continued)

FOREIGN PATENT DOCUMENTS

| | | | | |
|---|---|---|---|---|
| DE | WO 2007062818 A1 | * | 6/2007 | ............... G01N 5/00 |
| EP | 0779510 A2 | | 6/1997 | |

(Continued)

OTHER PUBLICATIONS

Marple, V.A., Rubow, K.L. & Behm, S.M., "A Microorifice Uniform Deposit Impactor (MOUDI): Description, Calibration, and Use," Aerosol Science and Technology, 14(4) (1991) 434-446.

(Continued)

*Primary Examiner* — Marrit Eyassu
(74) *Attorney, Agent, or Firm* — Westman, Champlin & Koehler, P.A.; Z. Peter Sawicki; Amanda M. Prose (57) ABSTRACT

An impactor, system and method for performing real-time measurements of particles in aerosol gases. The impactor comprises a plurality of cascading stages having impaction plates, mass-measurement mechanisms retained on the impaction plates, and a nozzle plate. A signal line associated with each of the plurality of cascading stages is configured to relay signals from the mass-measurement mechanism of the associated stage to a computer-based system configured to receive the transmitted signals from the signal lines, and to correlate changes in the resonant frequencies to particle concentrations in real time.

5 Claims, 7 Drawing Sheets

(58) Field of Classification Search
USPC .......................................................... 73/28.05
See application file for complete search history.

(56) References Cited

U.S. PATENT DOCUMENTS

| | | | | |
|---|---|---|---|---|
| 4,211,116 | A * | 7/1980 | Pilat | G01N 1/2208 73/863.22 |
| 6,431,014 | B1 * | 8/2002 | Liu | G01N 1/2208 73/28.05 |
| 6,453,758 | B1 * | 9/2002 | Marple | G01N 1/2208 209/133 |
| 6,786,075 | B2 | 9/2004 | Radke et al. | |
| 7,082,811 | B2 | 8/2006 | Marple et al. | |
| 7,251,982 | B2 | 8/2007 | Booker | |
| 8,225,681 | B2 | 7/2012 | Paur et al. | |
| 2002/0122177 | A1 | 9/2002 | Sioutas et al. | |
| 2002/0124632 | A1 | 9/2002 | Reiter et al. | |
| 2003/0034032 | A1 * | 2/2003 | Ziegler | A61M 11/00 128/203.12 |
| 2003/0054566 | A1 * | 3/2003 | Hochrainer | G01N 15/0255 436/181 |
| 2004/0259267 | A1 | 12/2004 | Gundel et al. | |
| 2005/0028616 | A1 * | 2/2005 | Marple | G01N 1/2208 73/863.22 |
| 2005/0124632 | A1 | 6/2005 | Kitada et al. | |
| 2005/0160792 | A1 | 6/2005 | Booker | |
| 2005/0172735 | A1 | 8/2005 | Booker | |
| 2006/0081515 | A1 * | 4/2006 | Gorbunov | G01N 15/0255 209/675 |
| 2007/0122349 | A1 * | 5/2007 | Wachtel | G01N 15/0205 424/45 |
| 2008/0047372 | A1 * | 2/2008 | Bridge | G01N 15/0255 73/863.22 |
| 2012/0045752 | A1 * | 2/2012 | Ensor | B82Y 15/00 435/5 |
| 2015/0024379 | A1 * | 1/2015 | Ensor | C12Q 1/24 435/5 |

FOREIGN PATENT DOCUMENTS

| | | |
|---|---|---|
| GB | 2023831 A | 1/1980 |
| WO | 03002981 A1 | 1/2003 |
| WO | 2007062818 A1 | 6/2007 |

OTHER PUBLICATIONS

Haggerty, James J. "Technology Twice Used: Atmosphere Analyzer" NASA Spinoff Magazine Apr. 1982 pp. 96-97. PDF File.

* cited by examiner

APPARATUS FOR REAL-TIME SIZE-DISTRIBUTED MEASUREMENT OF AEROSOL MASS CONCENTRATION

CROSS-REFERENCE TO RELATED APPLICATION

The present application is based on and claims the benefit of U.S. provisional patent application Ser. No. 61/947,134, filed Mar. 3, 2014, the content of which is hereby incorporated by reference in its entirety.

GOVERNMENT RIGHTS

This invention was made with U.S. Government support under Contract No. DE-SC0007561 awarded by the Department of Energy. The Government has certain rights in this invention.

BACKGROUND

Instruments for sampling and measuring particulate matter in aerosols are useful for a variety of purposes. They can be used for scientific research to study the nature of a particulate air pollutant and its transport and dispersion in the ambient atmosphere. They are also useful for studying the effect of a particulate air pollutant on human health. In addition, such instruments can also be used for sampling and measuring airborne particulate matter for regulatory compliance purposes to determine if levels are within safe limits prescribed by law.

SUMMARY

The present disclosure is directed to an impactor to provide real-time measurements of aerosol mass, a system incorporating the impactor, and a method of using the impactor and associated system. The impactor includes multiple cascading stages, where at each stage, aerosols of a certain size class are deposited on an impaction plate. The impactor incorporates a mass-measurement mechanism, preferably a quartz-crystal microbalance (QCM) sensor, on each stage to enable real-time mass measurements of the deposited particles. Furthermore, in some preferred embodiments, the impactor also includes humidity conditioning of the aerosol sample. The QCM-based measurements from the impactor are found to substantially agree with alternative measurements for moderate relative humidity.

Another aspect of the present disclosure relates to the impactor further comprising a plurality of cascading stages each comprising an impaction plate, a mass-measurement mechanism retained on the impaction plate and a nozzle plate. The impactor may also include a signal line associated with each of the plurality of cascading stages, wherein each signal line is configured to relay signals from the mass-measurement mechanism of the associated stage to a computer-based system. Further, the cascading stages, each comprising an impaction plate may each comprise a sensing quartz crystal without a reference crystal. A single quartz crystal may be used on each stage, as opposed to a dual crystal sensor.

The method for measuring a mass of particles from an aerosol according to the present disclosure comprises the steps of directing the aerosol into an impactor comprising a plurality of cascading stages, depositing the particles of the aerosol onto impaction plates of at least a portion of the cascading stages, detecting resonant frequencies of crystals retained by the impaction plates in response to masses of the deposited particles and correlating changes in the detected resonant frequencies to particle concentrations. Maintaining the relative humidity of the aerosol comprises measuring the relative humidity of the aerosol within the impactor; adjusting a humid air feed line in response to the measured relative humidity; and mixing the aerosol and the humid air prior to directing the aerosol to the impactor.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

DETAILED-DESCRIPTION

The present disclosure is directed to a multiple-stage impactor capable of performing real-time, size-distributed, mass measurements of particles in an aerosol. As discussed below, the impactor includes a mass-measurement mechanism (e.g., a quartz-crystal microbalance (QCM) sensor) in one or more the stages, and more preferably in each of the stages.

Figure 1:
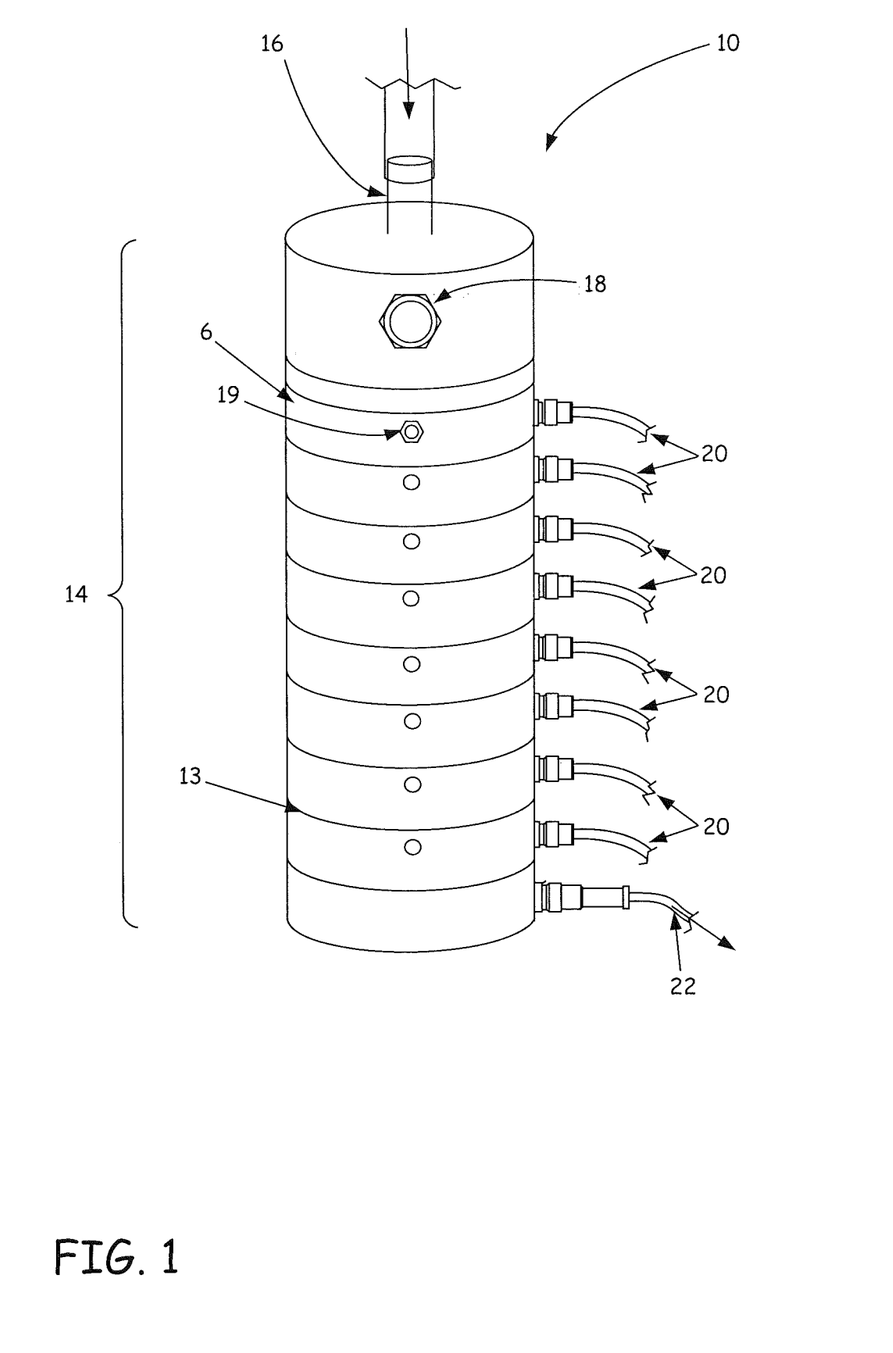
FIG. 1 is a side perspective view of an impactor of the present disclosure.

FIG. 1 illustrates impactor 10 of the present disclosure, which is a multiple-stage impactor, such as a cascade impactor from MSP Corporation, Shoreview, Minn. under the tradename "MOUDI", which is modified with QCM sensors. In the shown embodiment, impactor 10 includes thirteen stages covering a size range of 10 nanometers to 10,000 nanometers, where QCM sensors (not shown in FIG. 1) are mounted at stage 6-13. This covers an aerosol size range of 10 nanometers to 600 nanometers, which is of most interest in several aerosol applications (stages 1-5 covering larger particles up to 18 micrometers are not included in the example shown in FIG. 1).

The stages of impactor 10 (e.g., stages 1-13) are collectively referred to herein as cascading stages 14. While illustrated with thirteen (13) stages, impactor 10 may alternatively include any desired number of cascading stages 14. As further shown in FIG. 1, impactor 10 also includes aerosol inlet line 16, environment sensor 18 (e.g., for temperature and/or humidity sensing), pressure tap 19, signal lines 20, and gas outlet line 22.

Figure 2:
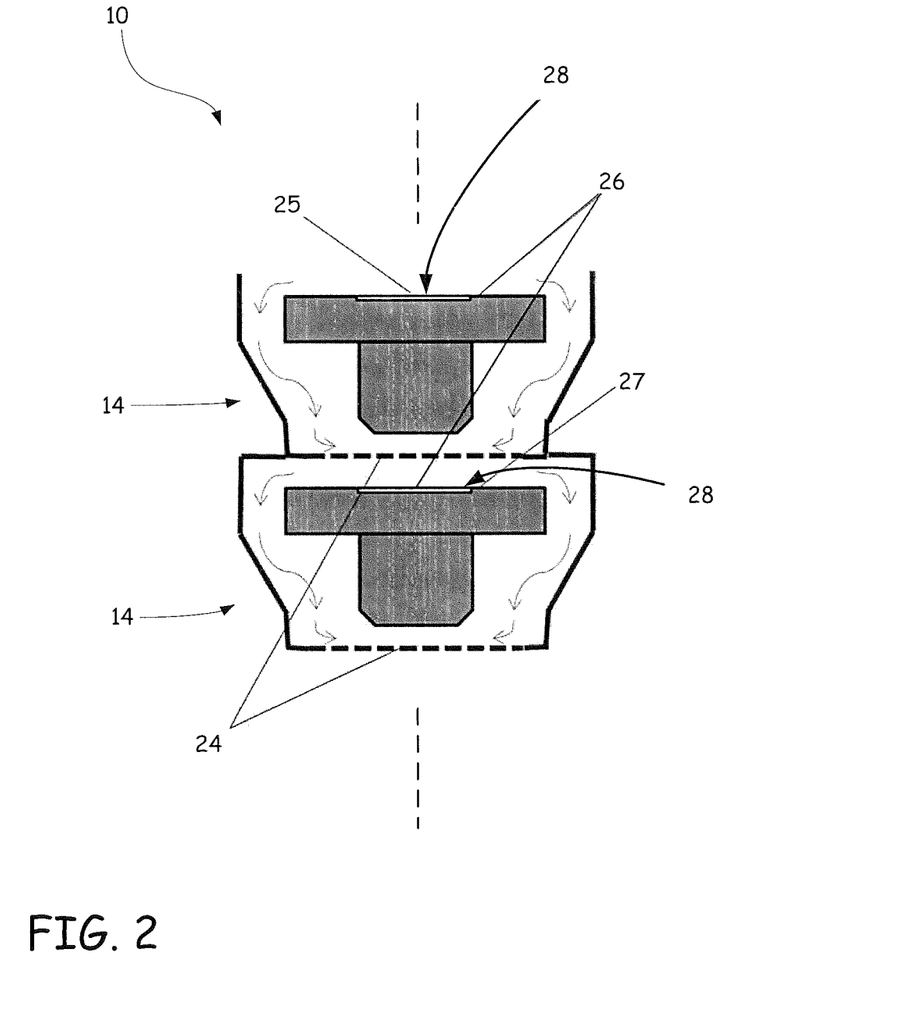
FIG. 2 is a side schematic illustration of two stages of the impactor.

FIG. 2 illustrates two of the cascading stages 14 in impactor 10, referred to as an upper stage 14 and lower stage 14, which may be any consecutive stages in the cascading arrangement of stages 14. A flow of sampled air, preferably an aerosol, is maintained through these stages 14 using a vacuum pumps that draw the sampled air from aerosol inlet line 16.

As shown, stages 14 each have a nozzle plate 24, an impaction plate 26, and a QCM sensor 28 flush mounted to the impaction plate 26. Air containing particles (an aerosol) is accelerated into the upper stage 14, where coarse particles above a certain aerodynamic diameter (cut-point of the stage) are deposited on the impaction surface 26 of the upper stage 14 due to inertia. In particular, these particles deposit onto QCM sensor 28, and optionally onto any active surface of impaction plate 26.

Finer particles are carried over with the air to the next lower stage 14. This net stage 14 has finer nozzles in its nozzle plate 24 and accelerates the flow to a higher velocity, so finer particles are deposited onto its impaction plate 26 and QCM sensor 28 (i.e. subsequent stages 14 preferably have lower cut-points). The net result of this process is that aerosols in the sampled air are size-classified and deposited on separate impaction plates 26 with the coarsest particles 25 depositing on the first impaction plate 26, and with the finest particles 27 depositing on the last impaction plate 26.

Figure 3:
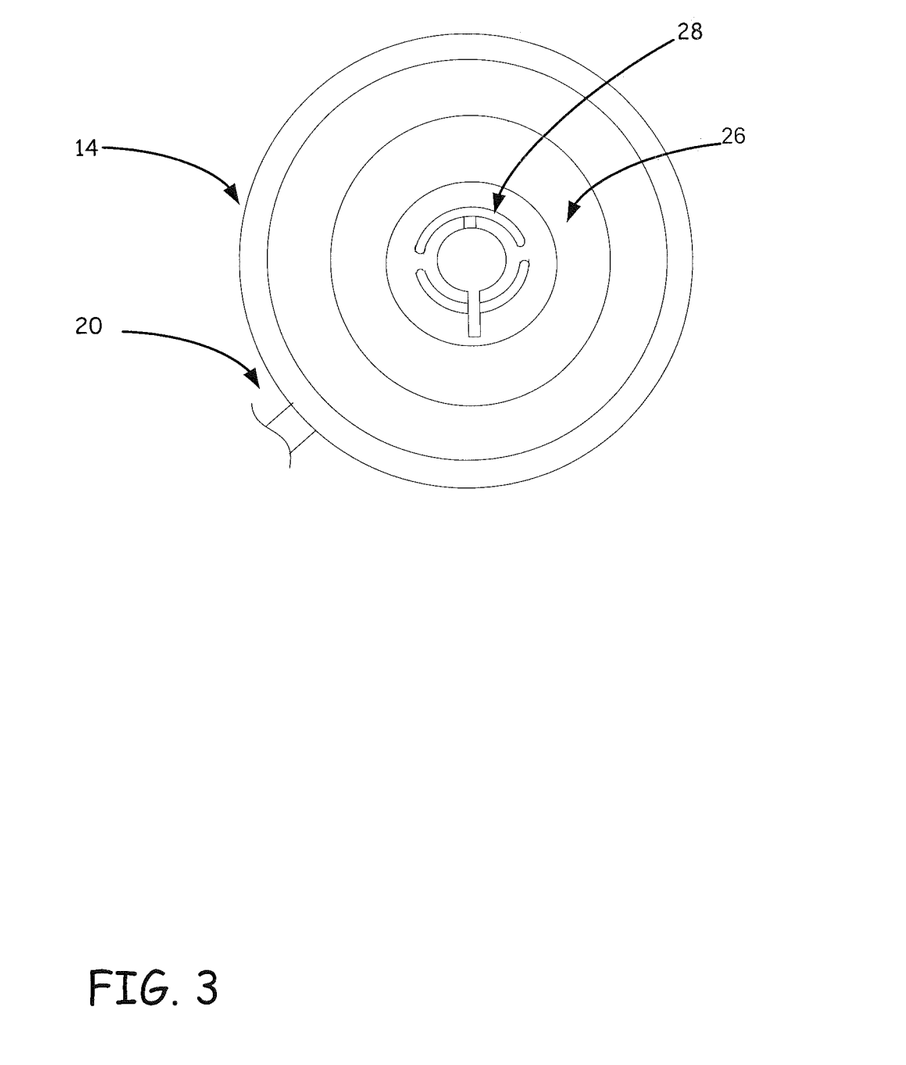
FIG. 3 is a top view of a QCM sensor mounted to an impaction plate for one of the stages of the impactor.

FIG. 3 shows an impaction plate 26 with a QCM sensor 28 flush mounted to it. The crystal of each QCM sensor 28 has gold electrodes on both the sides, which are connected to a frequency analyzer (at computer-based system 46, shown below in FIG. 4) via signal line 20, where the frequency analyzer determines the resonant frequency of the crystal. As aerosols deposit and attach to impaction plate 26, effective mass of the crystal increases and its natural frequency of vibration drops. This allows real-time measurements of the mass of the aerosol particles in the air sample, which can be separated by particle size due to the collections on the successive stages 14. In fact, mass depositions as low as 10 nanograms can be detected.

Figure 4:
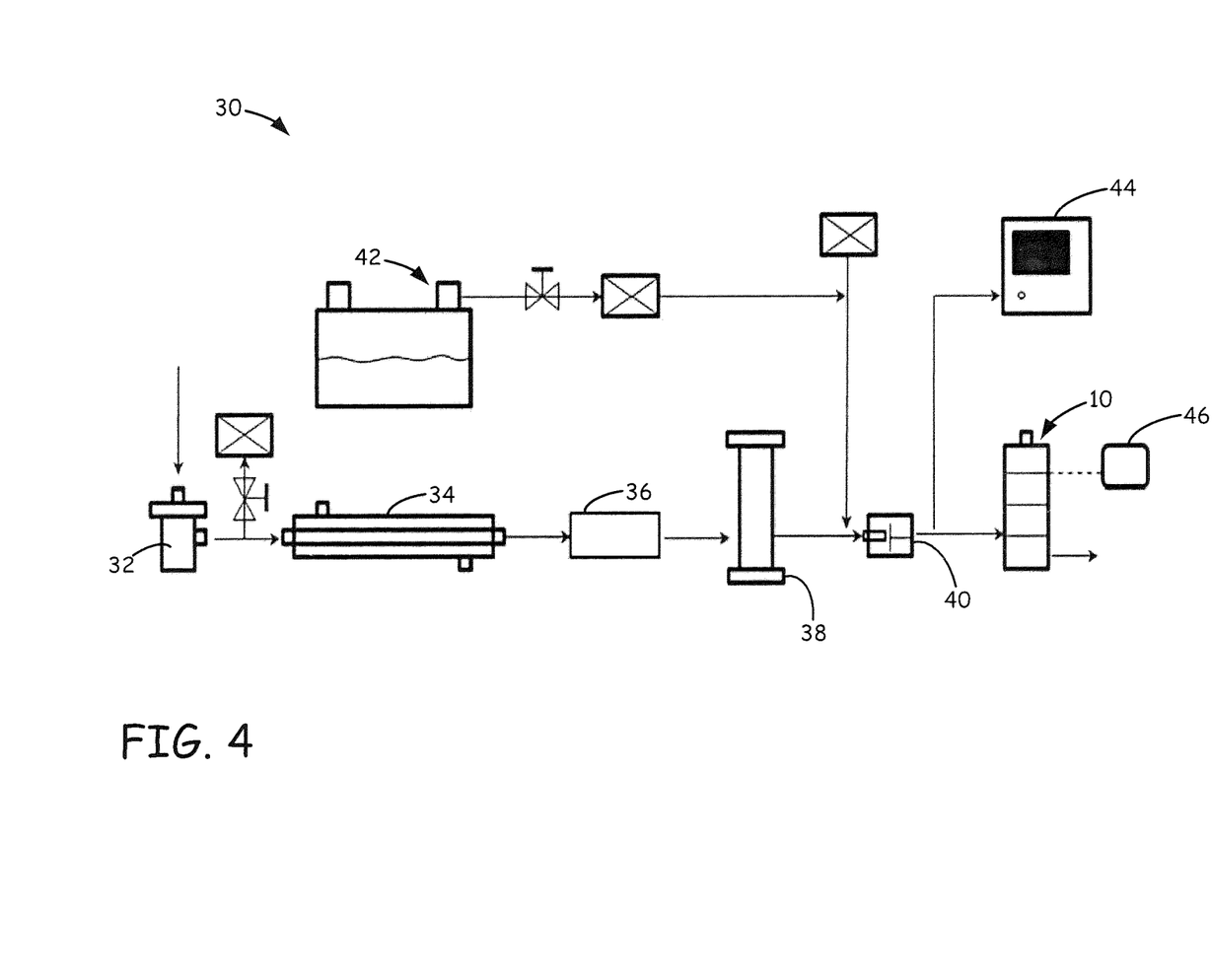
FIG. 4 is a schematic illustration of an example system that incorporates the impactor, such as for purposes of testing the impactor.

FIG. 4 shows a setup system 30 for a real-time testing of impactor 10. Particles of various compositions are generated by atomizing their corresponding solutions or suspensions with atomizer 32. A dryer 34 and neutralizer 36, may then be used to remove the water content in the particles before they enter the differential mobility analyzer (DMA) 38, where the particles are classified according to their electrical mobility. A suitable dryer 34 includes a NAFION Tubing dryer from Perma Pure LLC, Toms River, N.J.

An initial impactor 40 may then be used after the DMA 38 to remove the multiply-charged large particles. Remaining mono-dispersed particles are then mixed with relative humidity (RH)-conditioned make-up air from humidifier assembly 42. The flow is then split and sent into water condensation particle counter (CPC) 44 and impactor 10 of the present disclosure. The mass of particles sampled by impactor 10 can be estimated by measuring the drop in the resonant frequency of the QCM sensors 28. Since test particles are highly mono-dispersed with known density, their total mass can also be estimated based on particle concentration from the CPC 44.

In particular, a computer-based system 46 may connect to environment sensor 18 to receive real-time readings of temperature and/or humidity of the air sample within impactor 10. Computer-based system 46 may also connect to each of signal lines 20, and include a frequency monitor program, to measure the drop in the resonant frequency of the QCM sensor 28 in each monitored stage 14.

Computer-based system 46 may be one or more external computer systems (e.g., desktop, laptop, server-based, cloud-based, tablet, mobile media device, dedicated electronics device, and the like), and may include any suitable computer-based hardware, such as user interfaces, memory controllers, processors, storage media, input/output (I/O) controllers, communication adapters, and the like for monitoring and/or controlling the units of system 30. In particular, the processor of computer-based system 46 may monitor the temperature and/or humidity of the air sample within impactor 10 (via environment sensor 18).

The processor of computer-based system 46 may also run a frequency monitor program to measure the change (e.g., drop) in the resonant frequency of the QCM sensor 28 in each monitored stage 14. Furthermore, the frequency monitor program may also correlate the measured changes in the resonant frequencies to particle concentrations from the CPC 44, all in real time. All data read by the frequency monitor program may be stored on the storage media of computer-based system 46. Based on the correlations with CPC 44, the frequency monitor program may estimate the total mass measured by impactor 10, and may also quantify the mass in a size-distributed manner.

Figure 5:
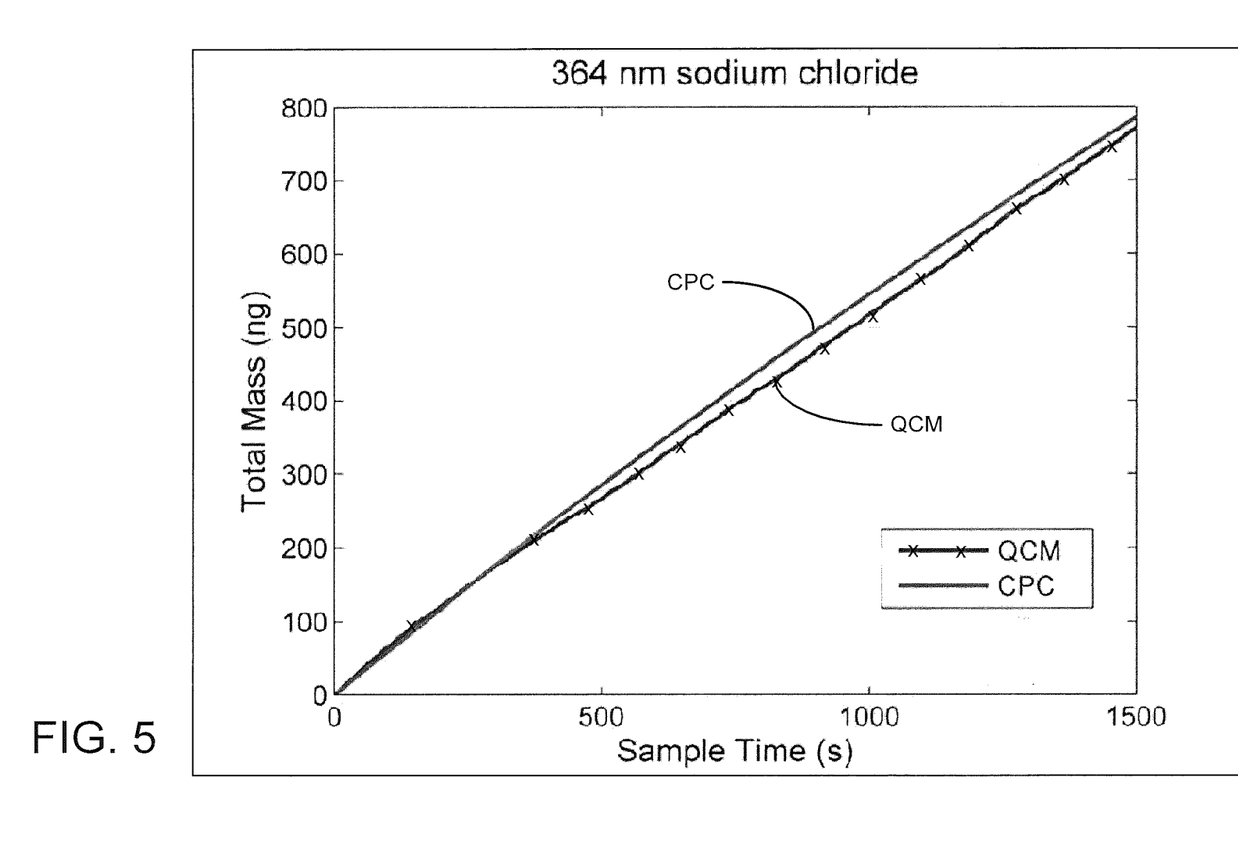
FIG. 5 is a graphical illustration of a total mass of sodium chloride aerosol measured with QCM versus an estimate based on condensation particle counter (CPC) data, where the experiment was carried out at 50% relative humidity.
Figure 6:
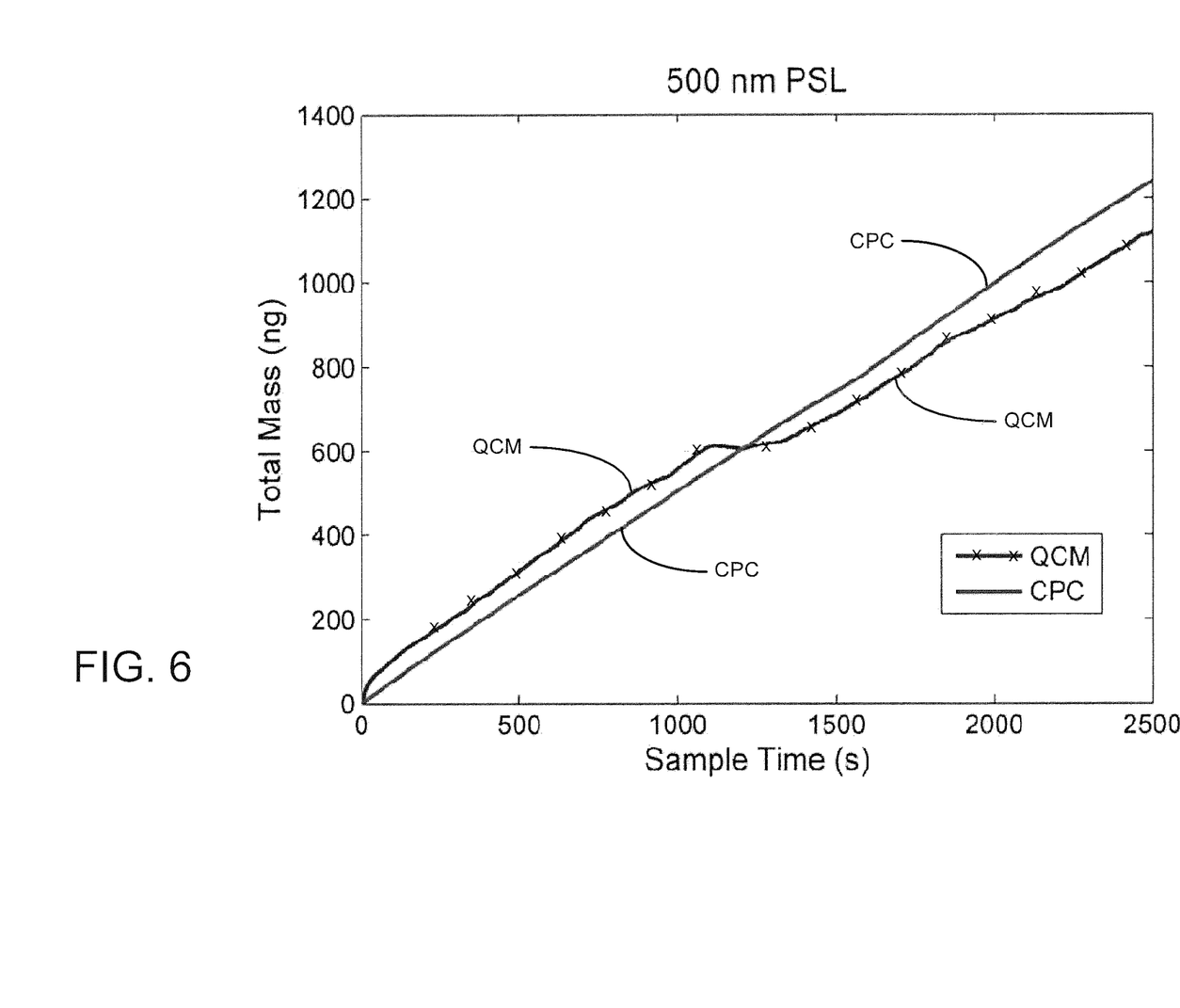
FIG. 6 is a graphical illustration of a total mass of PSL aerosol measured with QCM versus an estimate based on CPC data, where the experiment was carried out at 50% relative humidity.

For example, FIG. 5 illustrates the total mass measured by impactor 10, which was compared with the estimate based on CPC 44, for sodium chloride. Similarly, FIG. 6 illustrates the total mass measured by impactor 10, which was compared with the estimate based on CPC 44, for PSL particles. In each of FIGS. 5 and 6, the CPC plot is the reading from CPC 44 and the QCM plot was the total of the mass readings from the QCM crystal sensors 28 in impactor 10, where about 1 microgram was collected in each case. Good agreement was observed with a maximum difference of about 10% between the masses based on these two independent methods. These measurements were taken at moderate relative humidity (RH).

Figure 7:
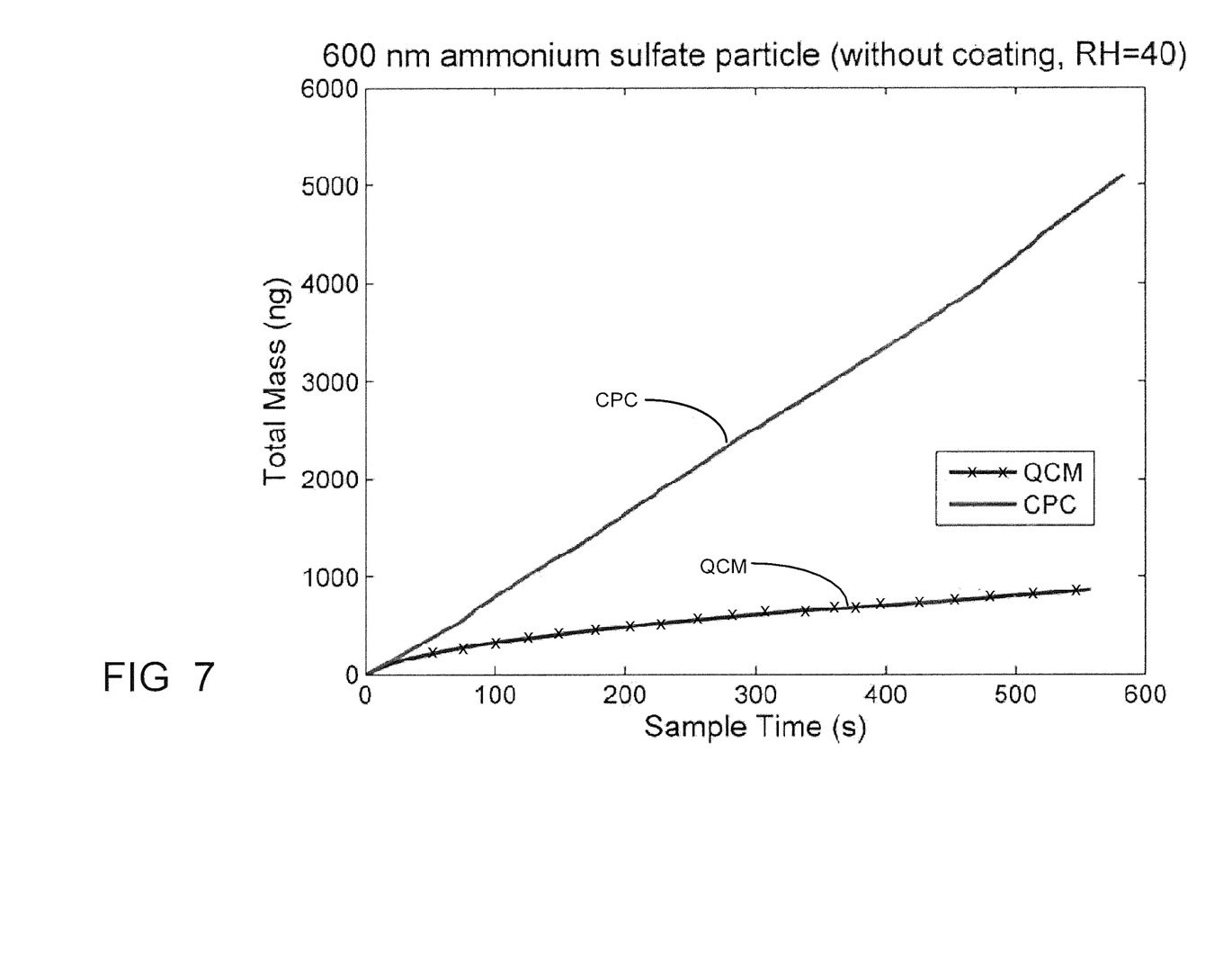
FIG. 7 is a graphical illustration of a total mass of ammonium sulfate particles measured with QCM versus an estimate based on CPC data, where the experiment was carried out at 40% relative humidity without coating.

The effect of relative humidity on particle deposition in impactor 10 was also investigated. Below about 50% relative humidity, particle bouncing became significant, where the deposited particles bounced off of QCM sensors 28. In these cases, the aerosol mass measured by impactor 10 was significantly lower than that estimated by CPC 44, as the particles bouncing off the surface of QCM sensors 28 did not contribute to the mass measurement, as illustrated in FIG. 7. It has been found that this problem can be remedied by raising the relative humidity of the air sample to or above about 50%, and/or by coating the surfaces of impaction plate 26 and QCM sensor 28 with an anti-bouncing agent.

Accordingly, in some preferred embodiments, computer-based system 46 may include one or more process control algorithms configured to adjust the mixing ratio of the RH-conditioned make-up air from humidifier assembly 42 with the aerosol gas in response to relative humidity readings from environment sensor 18. For instance, computer-based system 46 may adjust the humidity ratio from humidifier assembly 42 with the aerosol gas to maintain a desired relative humidity within impactor 10 (e.g., at least about 50% relative humidity), based on relative humidity measurements from environment sensor 18. Additionally (or alternatively), each impaction plate 26 and/or QCM crystal sensor 28 may include a coating (e.g., with an anti-bouncing agent) to reduce particle bouncing, reflection, and the like.

Although the present disclosure has been described with reference to preferred embodiments, workers skilled in the art will recognize that changes may be made in form and detail without departing from the spirit and scope of the disclosure.

The invention claimed is:

1. An impactor comprising:
   a plurality of cascading stages, each comprising:
      an impaction plate;
      a mass-measurement mechanism retained on the impaction plate; and
      a nozzle plate;
   a signal line associated with each of the plurality of cascading stages, wherein each signal line is configured to relay signals from the mass-measurement mechanism of the associated stage, comprising a sensing quartz crystal without a reference crystal, to a computer-based system; and
   a humidity conditioning mechanism for adjusting the relative humidity of the aerosol to a moderate relative humidity in a range of about 50% to 80% to ensure optimum particle-crystal coupling and reduce particle bouncing for mass-measurement.

2. The impactor of claim 1, wherein the mass-measurement mechanism comprises a quartz-crystal microbalance (QCM) sensor.

3. The impactor of claim 1, and further comprising an environment sensor configured to detect temperature, relative humidity, or combinations thereof within the impactor.

4. The impactor of claim 1, wherein the mass-measurement mechanism comprises a crystal whose frequency of vibration is sensitive to a mass of deposited particles on the mass-measurement mechanism.

5. The impactor of claim 1, wherein the mass-measurement mechanism, the impaction plate, or both comprise a coating to reduce particle bouncing.

* * * * *